US010400795B2

United States Patent
Mook et al.

(10) Patent No.: US 10,400,795 B2
(45) Date of Patent: *Sep. 3, 2019

(54) HIGH PRESSURE CYCLONIC SEPARATOR FOR TURBOMACHINERY

(71) Applicant: GENERAL ELECTRIC COMPANY, Schenectady, NY (US)

(72) Inventors: Joshua Tyler Mook, Cincinnati, OH (US); Christopher Williams, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 379 days.

This patent is subject to a terminal disclaimer.

(21) Appl. No.: 15/215,373

(22) Filed: Jul. 20, 2016

(65) Prior Publication Data

US 2018/0023595 A1 Jan. 25, 2018

(51) Int. Cl.
| | |
|---|---|
| *F02C 7/052* | (2006.01) |
| *F04D 29/70* | (2006.01) |
| *B01D 45/12* | (2006.01) |
| *B04C 3/06* | (2006.01) |
| *F01D 5/08* | (2006.01) |
| *F01D 25/12* | (2006.01) |
| *F04D 17/02* | (2006.01) |
| *F02C 6/08* | (2006.01) |

(52) U.S. Cl.
CPC ........... *F04D 29/701* (2013.01); *B01D 45/12* (2013.01); *B04C 3/06* (2013.01); *F01D 5/085* (2013.01); *F01D 25/12* (2013.01); *F02C 6/08* (2013.01); *F02C 7/052* (2013.01); *F04D 17/02* (2013.01); *F05D 2220/32* (2013.01); *F05D 2260/209* (2013.01)

(58) Field of Classification Search
CPC . F02C 7/052; F02C 6/08; F01D 5/085; B04C 3/06; B01D 45/12; F05D 2260/209
See application file for complete search history.

(56) References Cited

U.S. PATENT DOCUMENTS

| | | | |
|---|---|---|---|
| 2,698,672 A | * | 1/1955 | Burnside .................. B04C 5/02 208/127 |
| 3,066,912 A | | 12/1962 | Scheper, Jr. |
| 3,073,377 A | | 1/1963 | Robinson |
| 3,309,867 A | | 3/1967 | Ehrich |

(Continued)

FOREIGN PATENT DOCUMENTS

GB 2509886 A 7/2014

OTHER PUBLICATIONS

International Search Report and Written Opinion issued in connection with corresponding PCT Application No. PCT/US2017/042336 dated Oct. 23, 2017.

*Primary Examiner* — Matthew W Jellett
(74) *Attorney, Agent, or Firm* — Dority & Manning, P.A.

(57) ABSTRACT

The present disclosure generally relates to separating solid particles from an airflow in a gas turbine engine. A separator includes a plurality of vortex chambers arranged about a longitudinal axis of the gas turbine engine, each vortex chamber having a clean air outlet at a first end, a dirty outlet at a second end, and an air inlet transverse to the vortex chamber located at the first end. The separator also includes a sealable collection chamber in fluid communication with the dirty outlet of the each of the plurality of vortex chambers.

23 Claims, 7 Drawing Sheets

(56) References Cited

U.S. PATENT DOCUMENTS

| | | |
|---|---|---|
| 3,521,431 A | 7/1970 | Connors et al. |
| 3,534,548 A | 10/1970 | Connors |
| 3,733,814 A | 5/1973 | Hull, Jr. et al. |
| 3,832,086 A | 8/1974 | Hull, Jr. et al. |
| 3,892,612 A | 7/1975 | Carlson et al. |
| 3,993,463 A | 11/1976 | Barr |
| 4,158,449 A | 6/1979 | Sun et al. |
| 4,289,611 A | 9/1981 | Brockmann |
| 4,309,147 A | 1/1982 | Koster et al. |
| 4,617,028 A | 10/1986 | Ray et al. |
| 4,622,050 A | 11/1986 | O'Connor |
| 4,798,047 A | 1/1989 | Geary |
| 4,901,520 A | 2/1990 | Kozak et al. |
| 5,039,317 A | 8/1991 | Thompson et al. |
| 5,165,236 A | 11/1992 | Nieminen |
| 5,294,410 A | 3/1994 | White |
| 5,464,479 A | 11/1995 | Kenton et al. |
| 5,918,458 A | 7/1999 | Coffinberry et al. |
| 7,284,953 B2 | 10/2007 | Silverman et al. |
| 7,695,243 B2 | 4/2010 | Lee et al. |
| 7,777,155 B2 | 8/2010 | Twelves, Jr. et al. |
| 7,931,740 B2 | 4/2011 | Al-Alusi et al. |
| 8,092,145 B2 | 1/2012 | Martel et al. |
| 8,256,277 B2 | 9/2012 | Khibnik et al. |
| 8,469,309 B2 | 6/2013 | Stuart et al. |
| 8,506,836 B2 | 8/2013 | Szuromi et al. |
| 8,561,411 B2 | 10/2013 | Dibenedetto |
| 8,668,442 B2 | 3/2014 | Morris et al. |
| 9,046,056 B2 | 6/2015 | Lerg |
| 2009/0155088 A1 | 6/2009 | Lee et al. |
| 2009/0314161 A1* | 12/2009 | Al-Alusi ............... B01D 45/16 95/271 |
| 2010/0104422 A1* | 4/2010 | Martel .................. F02C 6/08 415/121.2 |
| 2011/0047959 A1 | 3/2011 | Dibenedetto |
| 2013/0323473 A1 | 12/2013 | Dietsch et al. |
| 2014/0119891 A1 | 5/2014 | Schmittenberg et al. |
| 2014/0182292 A1 | 7/2014 | Hudon et al. |
| 2014/0237954 A1 | 8/2014 | Snyder |
| 2014/0241850 A1 | 8/2014 | Duge |
| 2014/0286790 A1 | 9/2014 | Molter et al. |
| 2014/0290254 A1 | 10/2014 | Manning et al. |
| 2015/0052872 A1 | 2/2015 | Zurmehly et al. |
| 2017/0211475 A1 | 7/2017 | Mayer et al. |
| 2018/0021711 A1 | 1/2018 | Tyler et al. |
| 2018/0023473 A1* | 1/2018 | Manteiga ............. F02C 7/052 95/34 |

* cited by examiner

HIGH PRESSURE CYCLONIC SEPARATOR FOR TURBOMACHINERY

INTRODUCTION

The present disclosure generally relates to debris separation in a gas turbine engine.

BACKGROUND

In a gas turbine engine, intake air is compressed by a compressor. Fuel is added to the compressed air and ignited in a combustor. The expanding hot air passes through a turbine and out of a nozzle providing thrust. The turbine converts some of the energy of the expanding hot air into rotational energy for powering the compressor.

Various components of a gas turbine engine may be damaged and/or degraded when the intake air contains particles such as sand and dust. For example, sand may cause abrasion to compressor blades. As another example, dust may clog cooling holes and/or reduce cooling effectiveness in the turbine resulting in higher turbine temperatures. The damage to the engine components reduces the efficiency and lifespan of the engine.

Debris removal systems for gas turbine engines generally attempt to remove all types of debris from the intake air using a single separator. While a single separator may reduce the total amount of debris entering the components of the gas turbine engine, a single separator may not efficiently remove different types of debris. For example, if the single separator is optimized for removing large particles, small particles may pass through the compressor to the combustor and turbine. On the other hand, if the single separator is optimized for removing smaller particles, large particles may pass through the compressor, damaging the compressor. Further, the compressor may pulverize larger particles into smaller particles that may also damage the turbine.

In view of the above, it can be appreciated that there are problems, shortcomings or disadvantages associated with debris separation in gas turbine engines, and that it would be desirable if improved systems and methods for separating debris from an airflow in a gas turbine engine were devised.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a separator for separating solid particles from an airflow in a gas turbine engine. A separator includes a plurality of vortex chambers arranged about a longitudinal axis of the gas turbine engine, each vortex chamber having a clean air outlet at a first end, a dirty outlet at a second end, and an air inlet transverse to the vortex chamber located at the first end. The separator also includes a sealable collection chamber in fluid communication with the dirty outlet of the each of the plurality of vortex chambers.

In another aspect, the disclosure provides another separator for separating entrained solid particles from an airflow in a gas turbine engine. The separator includes a plurality of vortex chambers arranged about a longitudinal axis of the gas turbine engine. The separator also includes a sealable collection chamber in communication with a dirty outlet of the each of the plurality of vortex chambers. The plurality of vortex chambers separate at least 70 percent of the entrained solid particles from the airflow into the sealable collection chamber.

In another aspect, the disclosure provides a method for separating entrained solid particles from a compressed airflow in a gas turbine engine. The method includes extracting a secondary airflow from the compressed airflow via a plurality of openings in an impeller shroud surrounding a compressor impeller. The method also includes separating the entrained solid particles from the secondary airflow using a plurality of vortex chambers. The method further includes collecting the solid particles from a dirty outlet of each of the vortex chambers in a sealed collection chamber during operation of the gas turbine engine.

These and other aspects of the invention will become more fully understood upon a review of the detailed description, which follows.

DETAILED DESCRIPTION

Figure 1:
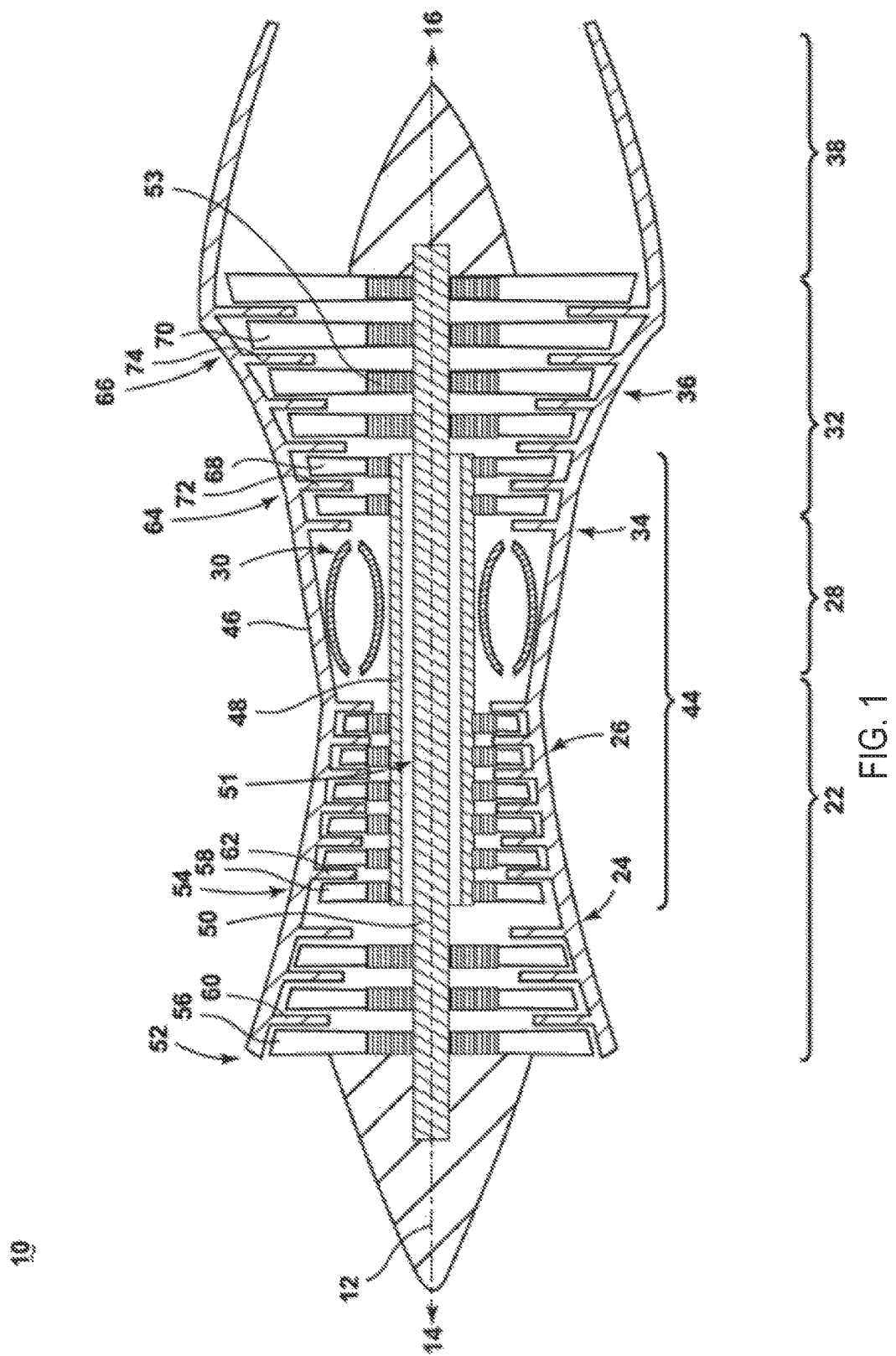
FIG. 1 is a schematic diagram showing a side section view of aspects of a conventional gas turbine engine.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear or outlet of the engine, or a component being relatively closer to the outlet than the inlet.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The HP compressor 26, the combustor 30, and the HP turbine 34 form a core 44 of the engine 10, which generates combustion gases. The core casing 46 surrounds the core 44.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can mount to a disk 53, which mounts to the corresponding one of the HP and LP spools 48, 50, with each stage having its own disk. The vanes 60, 62 mount to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, air is supplied to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the LP compressor 24.

Some of the ambient air can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
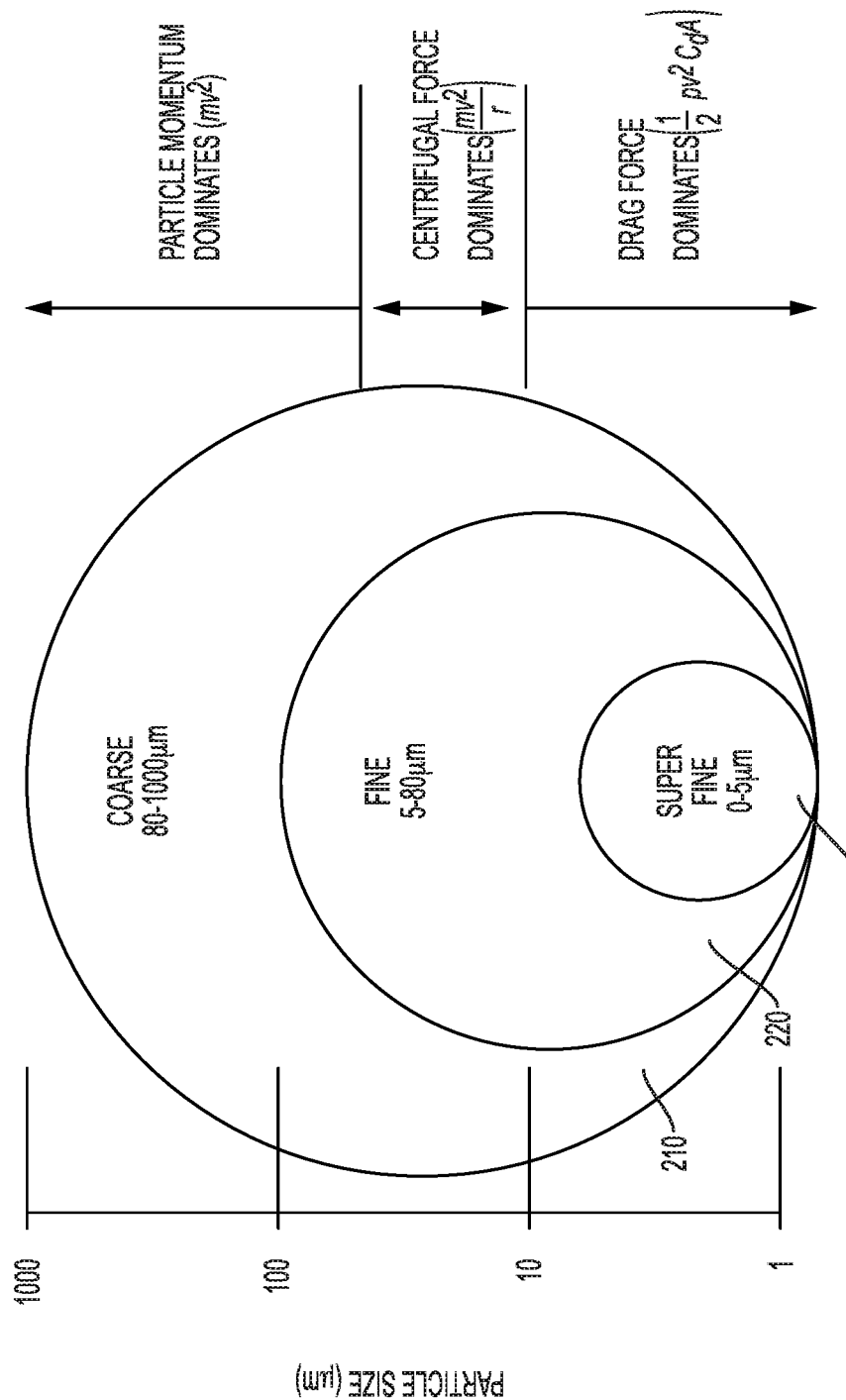
FIG. 2 is a diagram illustrating an example classification of debris particle sizes.

FIG. 2 is a diagram 200 illustrating an example classification of debris particle sizes. The diagram 200 illustrates three classifications of particle size, coarse particles 210, fine particles 220, and superfine particles 230. The coarse particles 210 generally have a mean particle diameter smaller than 1000 micrometers (microns or μm) and generally larger than 80 μm. The coarse particles 210 may be, for example, sand. The fine particles 220 generally have a mean particle diameter smaller than 80 μm and generally larger than 5 μm. The superfine particles 230 generally have a mean particle diameter smaller than 5 μm. The different particle sizes may behave differently within an airflow in a gas turbine engine, have different effects in a gas turbine engine, and damage different components of the gas turbine engine. For example, the behavior of coarse particles 210 is dominated by particle momentum. That is, the coarse particles 210 tend to travel in a line. The behavior of fine particles 220, however, may be dominated by centrifugal force. For example, fine particles may be pulled to the outside of the gas turbine engine as an air flow swirls. In contrast, the behavior of superfine particles 230 is dominated by drag force. For example, superfine particles 230 travel with the airflow and may stick to surfaces of the gas turbine engine. Coarse particles 210 tend to damage compressor rotor assemblies and impellers. In particular, the coarse particles 210 cause burrs and rollover on the leading edge of impellers and also round the tips as the coarse particles 210 abrade the spinning parts. Superfine particles 230 tend to accumulate on or within the combustor 30 or the turbine 34, 36. For example, superfine particles 230 may accumulate within cooling holes of the turbine blades and eventually block the cooling holes, leading to a rise in turbine temperature.

In an aspect, an inlet particle separator removes at least some of the coarse particles 210 before they enter the compressor section 22. Further details of an example inlet particle separator are described in copending U.S. application Ser. No. 15/002,839, filed Jan. 21, 2016, titled "INLET PARTICLE SEPARATOR FOR A TURBINE ENGINE," and U.S. patent application Ser. No. 15/215,353, titled "MULTI-STATION DEBRIS SEPARATION SYSTEM", filed Jul. 20, 2016, both of which are incorporated herein by reference in their entirety.

Figure 3:
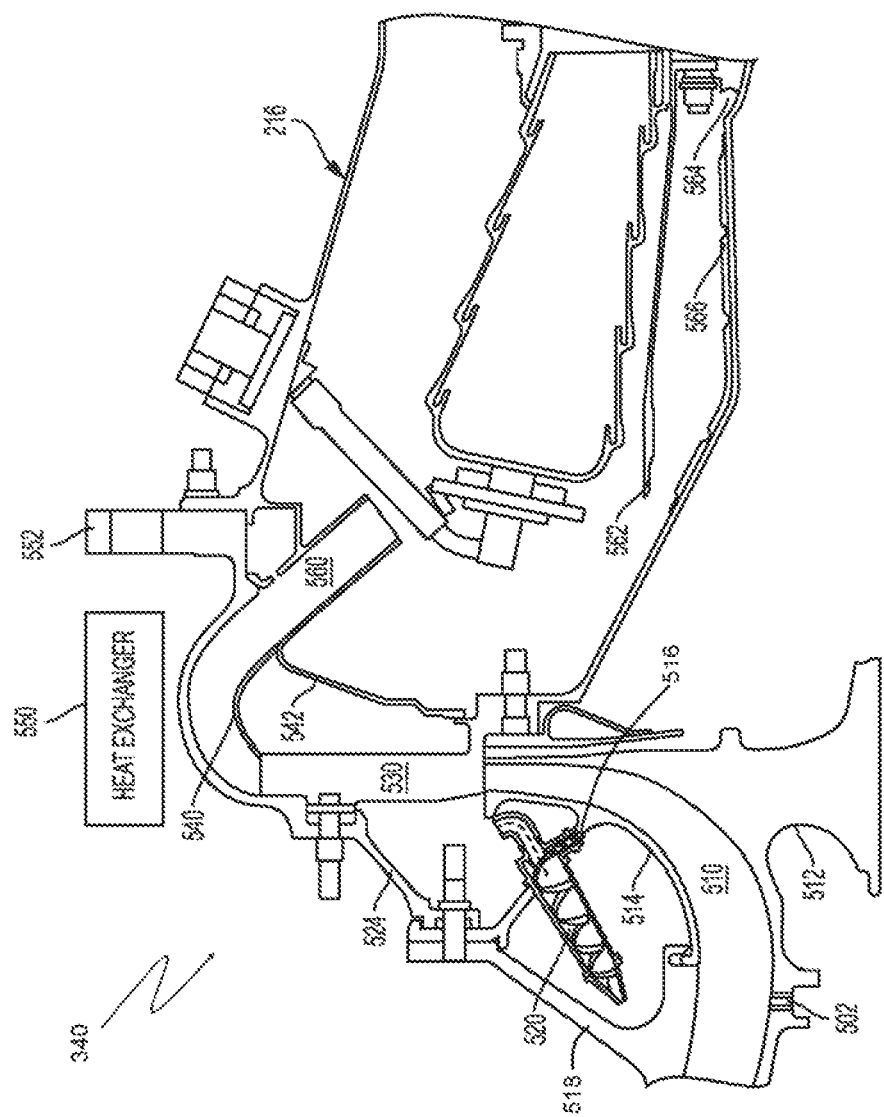
FIG. 3 is a side section view of an exemplary multi-stage particle separator.

FIG. 3 is a side section view of a multi-stage separator 340. The multi-stage separator 340 is located downstream from the compressor section 22, which compresses the inlet air flow and provides a compressed air flow. The compressor section 22 also pulverizes larger particles remaining within the input airflow into smaller particles (e.g., super-fine particles). The multi-stage separator 340 includes one or more separators that bleed a portion of the compressed airflow for various uses. For example, the multi-stage separator 340 includes a cyclonic separator 520 and a clean air offtake 344. In an aspect, the multi-stage separator 340 is adapted to remove smaller particles (e.g., fine and superfine particles) from the compressed airflow. The multi-stage separator 340 is designed to remove superfine particulate passing through the compressor. Preferably at least 70%, more preferably 80%, of the superfine material is removed at this stage.

The multi-stage separator 340 receives a compressed air flow from the compressor 314. In particular, the compressor impeller 510 is a last stage of the compressor section 22. As illustrated, the compressor impeller 510 is a centripetal impeller that further compresses the airflow and pushes the air in a radially distal direction against an impeller shroud 514. The impeller shroud 514 defines a portion of the flowpath having a reduced cross-section. As the compressed airflow leaves the compressor impeller 510, the airflow accelerates. The compressor impeller 510 and the impeller shroud 514 also turn the airflow in a radial distal direction. A compressor case 518 supports the impeller shroud 514 and also defines a space outside of the main flowpath between the compressor case 518 and the impeller shroud 514.

The multi-stage separator 340 includes a cyclonic separator 520, a diffuser 530, a clean air offtake 540, an optional heat exchanger 550, and a deswirler 560. The cyclonic separator 520 includes an intake 516 located along a radially distal surface of the impeller shroud 514. The radially distal surface defines a surface of the flowpath as the compressor impeller 510 turns the airflow in the radially distal direction. The intake 516 for example, includes a cowl having at least one opening within the radially distal surface of the impeller shroud 514. For example, the at least one opening may be a continuous slit or a plurality of openings. Because the solid particles entrained within the compressed airflow 504 are mostly superfine particles 230, the drag force tends to dominate, and the particles concentrate along the radially distal surface of the impeller shroud 514. A portion of the compressed airflow enters the cyclonic separator 520 via the plurality of openings, carrying the solid particles into the cyclonic separator 520.

In an embodiment, the cyclonic separator 520 includes a plurality of cyclonic chambers surrounding the impeller shroud 514. The cyclonic separator 520 is adapted for separating superfine particles because the drag force causes superfine particles to remain in an outer vortex while relatively clean air can be extracted from an inner vortex. The relatively clean air exits through an outlet to form a clean airflow while the solid particles are collected in a collection chamber. The collection chamber is a sealable collection chamber that is sealed during operation of the gas turbine engine 300. Accordingly, the compressed airflow 504 does not lose flow to a vent. The collection chamber is vented during a shutdown, cleaning, or startup operation. For example, the collection chamber is vented when an air starter is used to start the gas turbine engine 300.

The diffuser 530 conveys a first remaining portion of the compressed airflow 504 in the radially distal direction towards a deswirler 560. The diffuser 530 is supported by the diffuser case 524. The diffuser case 524 and the diffuser 530 define a flowpath for a cleaned airflow from the cyclonic separator 520. In other words, the cleaned air from the cyclonic separator 520 flows within the diffuser case 524 without reentering the primary airflow within the diffuser 530. Ducts or passages between walls of a multi-walled component (e.g., the deswirler 560) route the cleaned airflow to an optional heat exchanger 550 and downstream cooling and/or pressurization uses.

The deswirler 560 is located about a radially distal edge of the diffuser 530. The deswirler 560 turns the airflow in an axially aft direction and reduces lateral movement of the airflow. A radially distal surface of the deswirler 560 is defined in part by an engine mount 552 that forms a radially distal wall of the gas turbine engine 300. The clean air offtake 540 is located at a radially proximal surface of the deswirler 560. For example, the clean air offtake 540 includes an opening within the radially proximal surface of the deswirler 560 forming an inlet to the clean air offtake 540. Due to centrifugal force and drag forces, the remaining solid particles entrained within the primary airflow tend to drag along the radially distal surface of the diffuser 530 and the engine mount 552. Accordingly, the clean air offtake 540 separates a portion of relatively clean air from the compressed primary airflow. In an aspect, the clean air offtake 540 further includes a deflector partially covering the inlet to the clean air offtake 540. The deflector deflects solid particles away from the inlet to the clean air offtake 540 to provide a cleaner airflow within the clean air offtake 540.

The clean air offtake 540 also includes ducts or passages that form a secondary flowpath to an optional heat exchanger 550 and downstream cooling uses. A remaining portion of the compressed primary airflow travels through the deswirler 560 into the combustor 316.

The optional heat exchanger 550 cools one or more cleaned airflows. For example, the heat exchanger 550 is in fluid communication with the cyclonic separator 520 or the clean air offtake 540. The heat exchanger 550 includes separate flowpaths for the one or more cleaned airflows and for a relatively dirty waste airflow. For example, the waste airflow may be a bypass airflow or ambient air. The cleaned airflows may be a first cleaned airflow from the cyclonic separator 520 or a second cleaned airflow from the clean air offtake 540. Heat from the cleaned air flows, which are compressed, is transferred into the dirty airflow, which is then vented.

Figure 4:
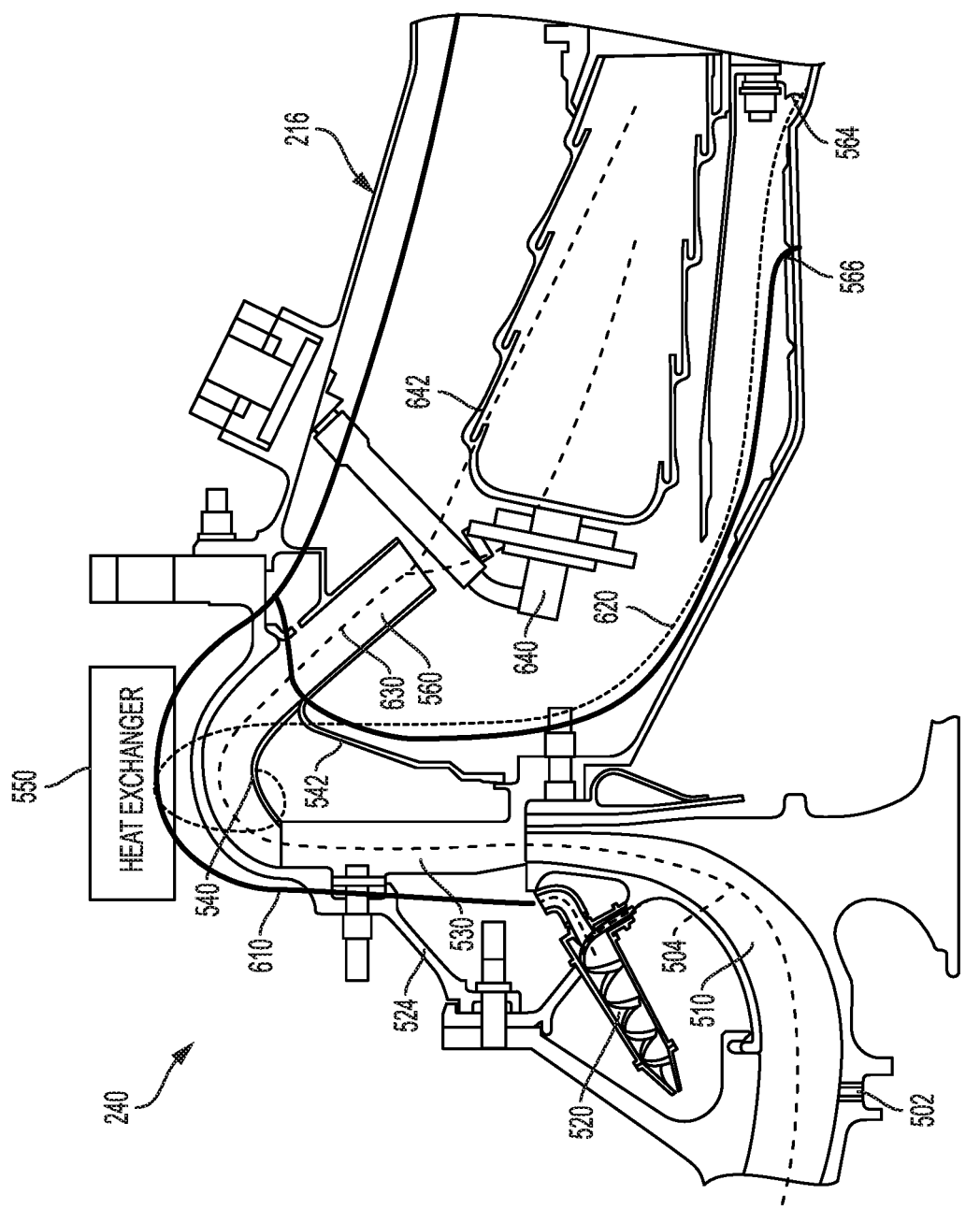
FIG. 4 is a side section view showing flowpaths within the exemplary multi-stage particle separator of FIG. 3.

FIG. 4 is a side section view showing airflows within the exemplary multi-stage separator 340. The compressor 314 provides a compressed airflow 504 from the compressor impeller 512 towards the impeller shroud 514, where the cyclonic separator 520 bleeds of a portion of the compressed airflow 504 and produces a first cleaned airflow 610. A remaining portion of the compressed airflow 504 travels through the diffuser 530 until the clean air offtake 540 bleeds off a second cleaned airflow 620. The remaining portion of the compressed airflow 504 becomes the flowpath airflow 630, which flows to the combustor 316. The flowpath airflow 630 enters the combustor 316 via a fuel nozzle 640, where the flowpath airflow 630 is mixed with fuel and ignited. The flowpath airflow 630 also enters the combustor 316 via openings in the combustor liner 642.

The second cleaned airflow 620 may be the cleanest airflow. For example, the second cleaned airflow 620 may have a lower concentration of solid particles than the compressed airflow 504, the first cleaned airflow 610, or the flowpath airflow 630. The second cleaned airflow 620 may be used to cool a first stage of a high pressure turbine 320. The second cleaned airflow 620 flows through an optional heat exchanger 550 on its way to the high pressure turbine 320. Ducts or passages within the multi-walled components of the gas turbine engine 300 route the second cleaned airflow 620 to an accelerator 564. The second cleaned airflow 620 is passed from the accelerator 564 through the turbine blades via cooling holes and provides for thin film cooling of the turbine blades.

The first cleaned airflow 610 is routed to a second stage of the high pressure turbine 320. The first cleaned airflow 610 may be of lower pressure than the second cleaned airflow 620. Ducts or passages within the multi-walled components of the gas turbine engine 300 route the first cleaned airflow 610 to the second stage of the high pressure turbine via an outer shell of the combustor 216 and via a bearing sump 566. The second stage of the high pressure turbine 320 may operate at a lower temperature than the first stage of the high pressure turbine and be less susceptible to damage from solid particles.

Figure 5:
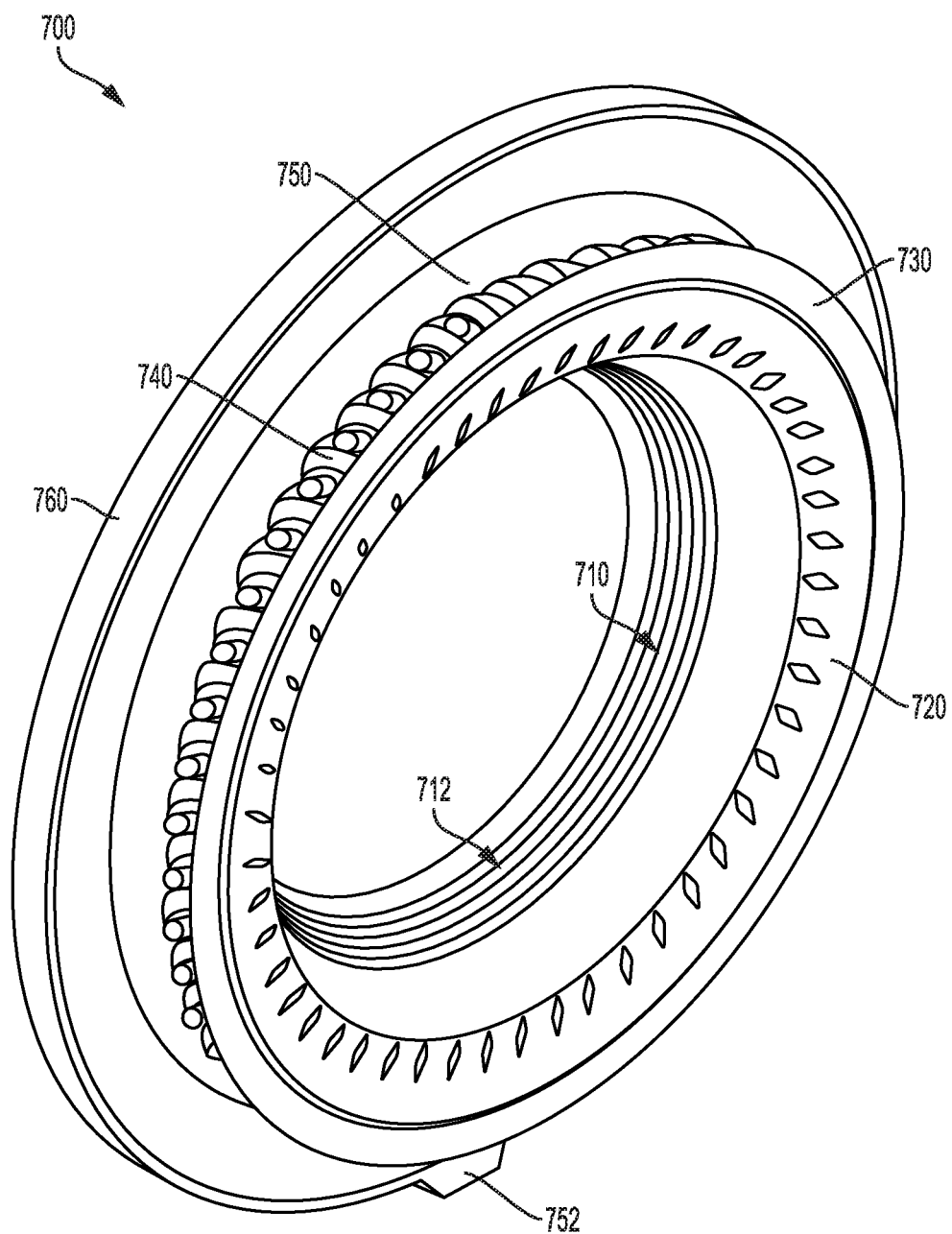
FIG. 5 is a perspective view of a cyclonic separator.

FIG. 5 is a perspective view of a cyclonic separator 700. The cyclonic separator 700 is an example of the cyclonic separator 520. It should be appreciated, however, that a cyclonic separator 700 may be located in a different position within the core 302. For example, the cyclonic separator 700 may be located before the compressor 314. The cyclonic separator 700 includes a cowl 710 including a plurality of openings 720 in fluid communication with a plurality of vortex chambers 740. A rim 730 defines an end of the cowl 710. The vortex chambers 740 are in fluid communication with a collection chamber 750, which also defines a body of the cyclonic separator 700. A flange 760 is connected to the collection chamber 750 to provide structural support and attachment points for the cyclonic separator 700.

The cowl 710 defines radially distal surface of a flowpath within the core 302. In an embodiment, the cowl 710 is the radially distal surface of the impeller shroud 514. That is, the cowl 710 helps restrict the flowpath of the compressed air from the compressor 314. Moreover, because the compressed air is rotating laterally within the cowl 710, particles entrained within the compressed air experience centrifugal force causing the particles to contact the cowl 710. In an embodiment, the cowl 710 includes ridges 712 that increase a drag force on the particles and help slow the axial movement of the particles.

The plurality of openings 720 are located toward an axially distal end of the cowl 710. In an embodiment, the openings 720 are axially elongated. The size, shape, and number of the openings 720 may be varied to bleed off a desired portion of the compressed air. For example, the number of openings 720 may be between approximately 10 and 100, preferably approximately 60. Each opening 720 is in fluid communication with a respective vortex chamber 740. As will be described in further detail below, the opening 720 leads to an inlet of the vortex chamber 740. The vortex chamber 740 creates an outer vortex that pulls solid particles into the collection chamber 750 and an inner vortex that pulls clean air to an outlet of the vortex chamber 740.

The collection chamber 750 includes one or more hollow regions that receive particles from the vortex chambers 740. In an embodiment, the collection chamber 750 is sealable. For example, the collection chamber 750 includes one or more vents 754 that may be opened or closed. The vents 754 are closed during operation of the gas turbine engine 300. Accordingly, the collection chamber 750 retains the collected particles during operation. Moreover, because the collection chamber 750 is not vented during operation, the collection chamber 750 does not cause a loss in pressure. The collection chamber 750 is vented during a shutdown, cleaning, or startup operation. During a startup operation, venting via the collection chamber 750 helps reduce backpressure on the compressor 314.

Figure 6:
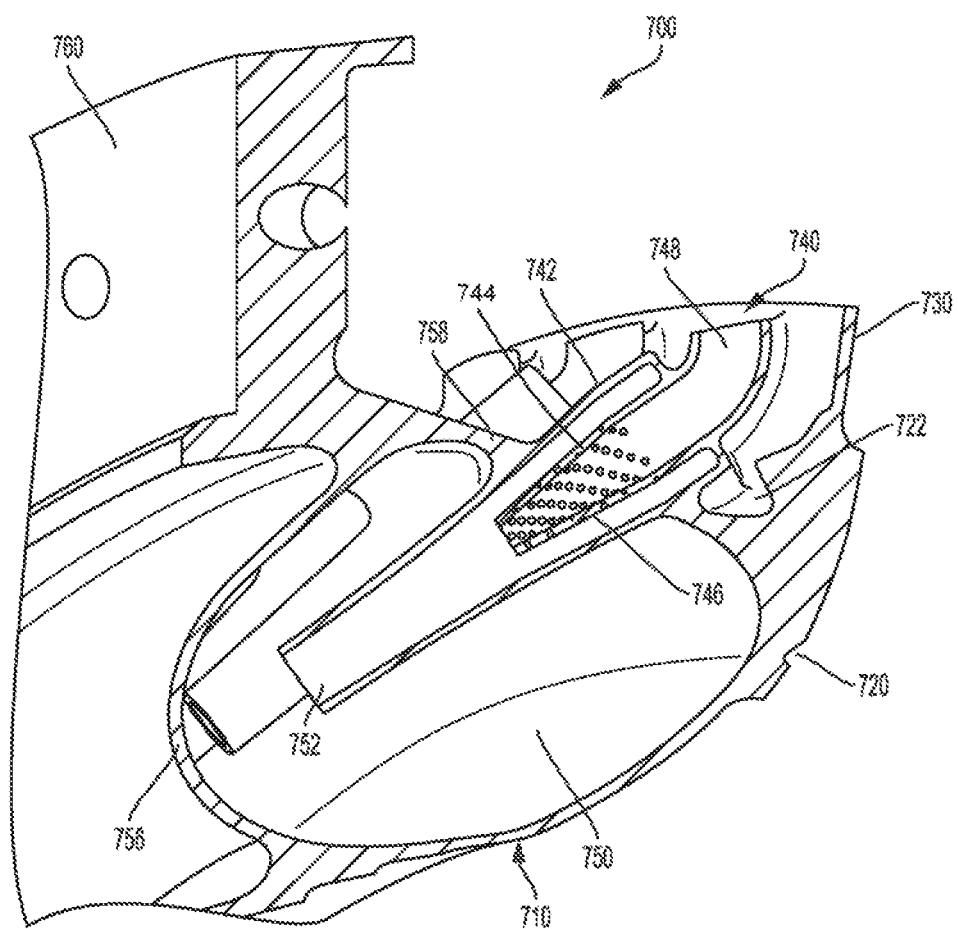
FIG. 6 is an axial cross-sectional view of the cyclonic separator in FIG. 5.
Figure 7:
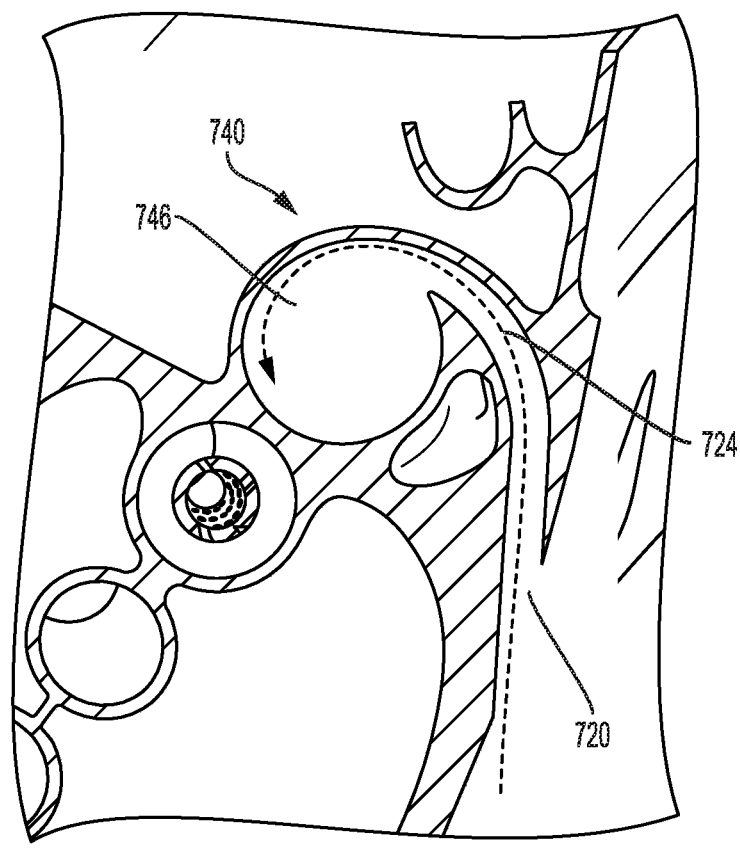
FIG. 7 is transverse cross-sectional view of the cyclonic separator in FIG. 5.

FIGS. 6 and 7 illustrate further details of the cyclonic separator 700. FIG. 6 is an axial cross-sectional view of the cyclonic separator 700 and one of the vortex chambers 740. FIG. 7 is transverse cross-sectional view of the cyclonic separator 700. The opening 720 is in fluid communication with the vortex chamber 740 via a curved passage 722. The curved passage 722 causes an airflow 724 to bend, starting a cyclonic motion. As best seen in FIG. 6, the curved passage 722 communicates with a first end of the cyclonic chamber through an outer wall 742 that defines the vortex chamber 740. The outer wall 742 has a generally conical shape and extends longitudinally to an open second end 752. A centrally located vortex finder 744 extends longitudinally from the first end of the vortex chamber 740. The vortex finder 744 defines an exit flowpath 748. The vortex finder 744 includes a cylindrical portion having a solid wall located adjacent the first end of the vortex chamber 740 and a conical portion 746 having a perforated wall extending longitudinally from the cylindrical portion.

The second end 752 of the vortex chamber 740 extends in a radially proximal direction into the collection chamber 750. The second end 752 is located near a radially proximal surface 756 of the collection chamber 750. The vortex chamber 740 may also be angled laterally.

In operation, the airflow 724 of compressed air enters the opening 720 and follows the curved passage 722 into the vortex chamber 740. The outer wall 742 and the cylindrical portion of the vortex finder 744 continue to bend the airflow 724 to form an outer vortex spiraling about the vortex finder 744. As the airflow 724 reaches the conical portion 746, solid particles entrained in the airflow 724 tend to move to the outer wall 742 due to centrifugal and drag forces. Clean air near the center of the vortex chamber 740 enters the vortex finder 744 via the perforations and via the inner vortex opening. The dirty air entraining the solid particles continues to move longitudinally and is discharged via the second end 752 into the collection chamber 750. The lateral angle of the vortex chambers 740 imparts a circular movement to the air within the collection chamber 750. The solid particles are drawn toward the radially distal wall 758 of the collection chamber rather than reentering the second end 752. The exit flowpath 748 provides a clean airflow, for example, the first cleaned airflow 610.

The components of the gas turbine engine 300 may be manufactured using an additive manufacturing (AM) process. AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process, direct metal laser melting (DMLM), uses an energy beam, for example, an electron beam or electromagnetic radiation such as a laser beam, to sinter or melt a powder material, creating a solid three-dimensional object in which particles of the powder material are bonded together. AM may be particularly applicable for manufacturing, for example, the cyclonic separator 700, which includes multiple concentric and coaxial subcomponents. In an aspect, the cyclonic separator 700 may be fabricated in a layer-by-layer manner along the longitudinal axis. The AM process may fabricate the cyclonic separator 700 as an integrated structure.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A separator for separating solid particles from an airflow in a gas turbine engine, comprising:
   a plurality of vortex chambers arranged about a longitudinal axis of the gas turbine engine, each vortex chamber having a clean air outlet at a first end, a dirty outlet at a second end, and an air inlet transverse to the vortex chamber located at the first end; and
   a sealable collection chamber in fluid communication with the dirty outlet of the each of the plurality of vortex chambers, wherein the vortex chamber is disposed at a lateral angle in the collection chamber relative to the longitudinal axis to impart a circular movement of air into the collection chamber, wherein the plurality of vortex chambers are each configured to create an outer vortex that pulls solid particles into the collection chamber, and further wherein the plurality of vortex chamber are each configured to create an inner vortex that pulls clean air to an outlet of the vortex chamber.

2. The separator of claim 1, wherein the sealable collection chamber is adapted to be sealed during operation of the gas turbine engine.

3. The separator of claim 1, wherein the sealable collection chamber is adapted for venting during at least one of an engine start operation, an engine shutdown operation, and a cleaning operation.

4. The separator of claim 3, wherein the venting relieves back pressure against the compressor during the engine start operation.

5. The separator of claim 3, wherein each vortex chamber comprises a vortex finder within the vortex chamber separating the air inlet from the clean air outlet.

6. The separator of claim 5, wherein each vortex finder is perforated.

7. The separator of claim 5, wherein each vortex finder separates an outer vortex fed by the respective air inlet from an inner vortex of relatively clean air.

8. The separator of claim 1, wherein the separator is located downstream from a compressor.

9. The separator of claim 1, further comprising a cowl in fluid communication with an output airflow from the compressor, the cowl including a plurality of openings, each of the openings in fluid communication with the air inlet of a respective cyclonic separator.

10. The separator of claim 9, wherein the cowl is located within an impeller shroud arranged circumferentially about a final stage centripetal impeller of the compressor.

11. The separator of claim 9, wherein an airflow within each air inlet has a higher density of particles than the output airflow from the compressor.

12. The separator of claim 1, wherein the clean air outlet is in fluid communication with a cooling system.

13. The separator of claim 12, wherein the cooling system is a high pressure turbine second stage cooling device.

14. The separator of claim 12, wherein the cooling system includes cooling holes within a turbine rotor.

15. The separator of claim 1, wherein the solid particles have an average particle size less than 5 micrometers.

16. The separator of claim 1, wherein an inside wall of the vortex chamber deflects air circumferentially to form an outer vortex.

17. A separator for separating entrained solid particles from an airflow in a gas turbine engine, comprising:
   a plurality of vortex chambers arranged about a longitudinal axis of the gas turbine engine; and
   a sealable collection chamber in communication with a dirty outlet of the each of the plurality of vortex chambers, wherein the vortex chamber is disposed at a lateral angle in the collection chamber relative to the longitudinal axis to impart a circular movement of air into the collection chamber, and wherein the plurality of vortex chambers separate at least 70 percent of the entrained solid particles from the airflow into the sealable collection chamber.

18. The separator of claim 17, wherein the plurality of vortex chambers separate at least 80 percent of the entrained solid particles from the airflow into the sealable collection chamber.

19. A method for separating entrained solid particles from a compressed airflow in a gas turbine engine, comprising:
   extracting a secondary airflow from the compressed airflow via a plurality of openings in an impeller shroud surrounding a compressor impeller;
   separating the entrained solid particles from the secondary airflow using a plurality of vortex chambers positioned at a lateral angle in a collection chamber relative to a longitudinal axis of the gas turbine engine; and
   collecting the solid particles from a dirty outlet of each of the vortex chambers in a sealed collection chamber during operation of the gas turbine engine.

20. The method of claim 19, wherein separating the entrained solid particles comprises separating at least 70 percent of the entrained solid particles from the secondary airflow.

21. The method of claim 20, wherein separating the entrained solid particles comprises separating at least 80 percent of the entrained solid particles from the secondary airflow.

22. The method of claim 19, further comprising providing a cleaned airflow from a clean outlet of each of the vortex chambers to a cooling system.

23. The separator of claim 1, wherein the collection chamber further comprises a radially distal wall relative to the vortex chamber, and wherein the radially distal wall is configured to draw particles thereto, and further wherein the vortex chamber comprises a conical outer wall extended into the collection chamber, the outer wall configured to form the outer vortex of air spiraling about a vortex finder comprising a conical portion extended within the outer wall.

* * * * *